(12) United States Patent
Duez et al.

(10) Patent No.: US 12,275,300 B2
(45) Date of Patent: Apr. 15, 2025

(54) FRAME FOR A MOTOR VEHICLE TANK

(71) Applicant: Plastic Omnium Advanced Innovation and Research, Brussels (BE)

(72) Inventors: Laurent Duez, Brussels (BE); Antoine Chaussinand, Brussels (BE); Damien Reveillard, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/686,692

(22) PCT Filed: Sep. 5, 2022

(86) PCT No.: PCT/EP2022/074578
§ 371 (c)(1),
(2) Date: Feb. 26, 2024

(87) PCT Pub. No.: WO2023/031451
PCT Pub. Date: Mar. 9, 2023

(65) Prior Publication Data
US 2024/0262185 A1  Aug. 8, 2024

(30) Foreign Application Priority Data
Sep. 6, 2021 (LU) ........................................ 500623

(51) Int. Cl.
*B60K 15/077* (2006.01)
*B60K 15/03* (2006.01)
(Continued)

(52) U.S. Cl.
CPC ...... *B60K 15/03177* (2013.01); *B60K 15/035* (2013.01); *B60K 15/077* (2013.01);
(Continued)

(58) Field of Classification Search
CPC ........ B60K 15/077; B60P 3/00; B60P 3/2205; B60P 3/22; B65D 88/12
(Continued)

(56) References Cited

U.S. PATENT DOCUMENTS

| 6,408,979 B1 * | 6/2002 | Forbes .................. G10K 11/16 |
| | | 181/198 |
| 2001/0009257 A1 * | 7/2001 | Bauer .................. B60K 15/077 |
| | | 137/574 |

(Continued)

FOREIGN PATENT DOCUMENTS

| CN | 102112286 A | 6/2011 |
| CN | 104684749 A | 6/2015 |

(Continued)

OTHER PUBLICATIONS

International Search Report Issued Oct. 12, 2022, in PCT/EP2022/074578, filed on Sep. 5, 2022, 2 pages.

*Primary Examiner* — Stephen J Castellano
(74) *Attorney, Agent, or Firm* — Oblon, McClelland, Maier & Neustadt, L.L.P.

(57) ABSTRACT

A frame for a plastic tank for a motor vehicle, containing at least one means for attaching an internal reinforcing element of the plastic tank which is intended to connect two opposite walls of said plastic tank. The at least one means for attaching the internal reinforcing element includes at least one first structure configured to snap-fit at least a portion of the internal reinforcing element. The at least one first structure contains at least two bodies that are movable relative to each other. The at least two bodies are provided with a holding means configured to hold the internal reinforcing element in a direction opposite to a snap-fitting direction, and at least one stop element, separate from the at least two bodies, protruding in a direction opposite to the (Continued)

Figure 1:
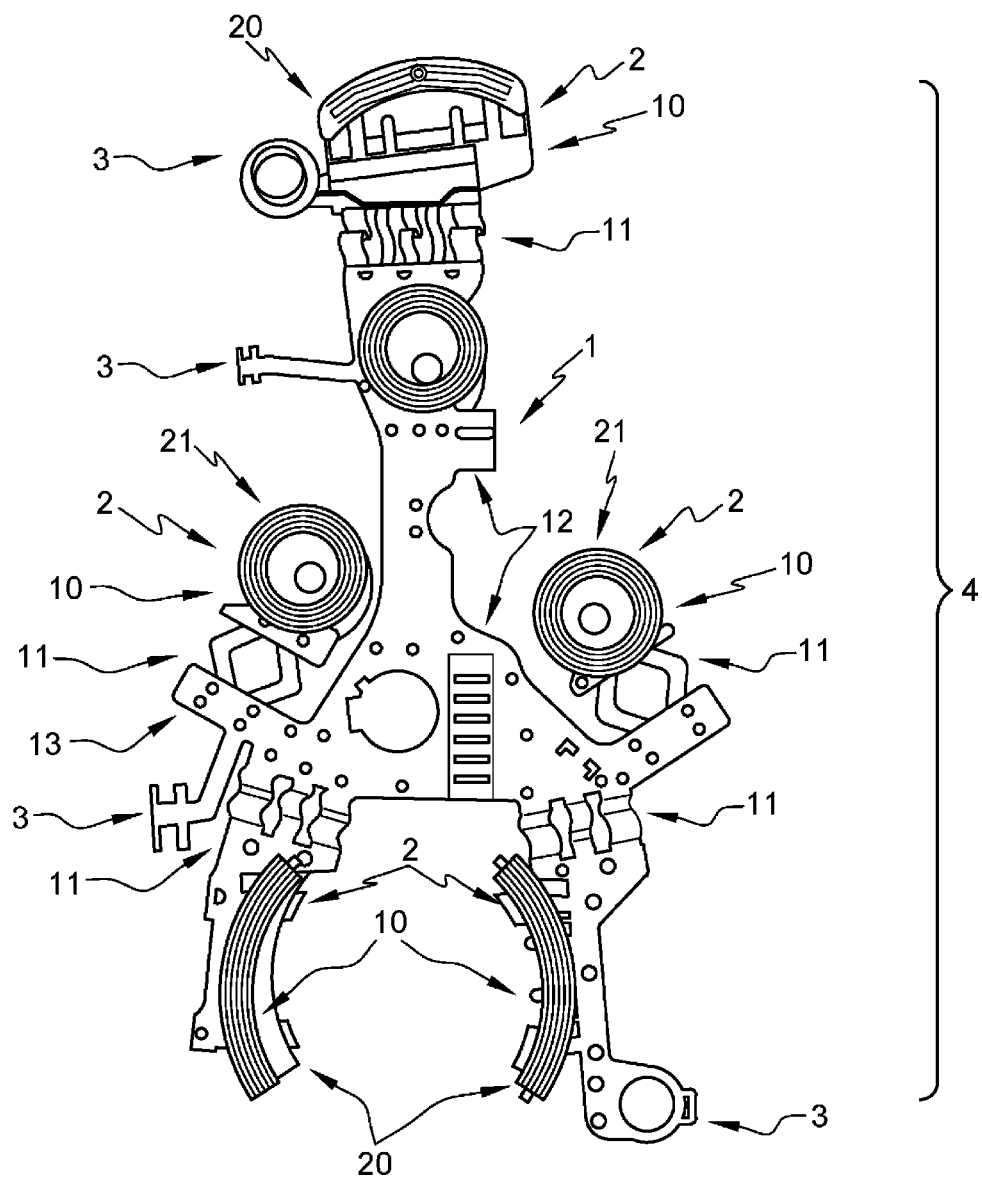

snap-fitting direction in order to provide a stop for the internal reinforcing element when said element is snap-fit into place.

17 Claims, 2 Drawing Sheets

(51) Int. Cl.
    *B60K 15/035*     (2006.01)
    *B65D 88/74*     (2006.01)

(52) U.S. Cl.
    CPC .. *B65D 88/748* (2013.01); *B60K 2015/03032* (2013.01); *B60K 2015/03217* (2013.01); *B60K 2015/03493* (2013.01)

(58) Field of Classification Search
    USPC .................................................. 220/563, 564
    See application file for complete search history.

(56) References Cited

U.S. PATENT DOCUMENTS

| | | |
|---|---|---|
| 2011/0226777 A1 | 9/2011 | Asahara et al. |
| 2012/0138606 A1 | 6/2012 | Varga |
| 2016/0200192 A1 | 7/2016 | Tsukahara et al. |
| 2019/0092159 A1 | 3/2019 | Amano et al. |

FOREIGN PATENT DOCUMENTS

| | | |
|---|---|---|
| CN | 105658462 A | 6/2016 |
| CN | 108146230 A | 6/2018 |
| CN | 112009235 A | 12/2020 |
| EP | 3 572 265 A1 | 11/2019 |
| KR | 20210012208 A | 2/2021 |

* cited by examiner

FRAME FOR A MOTOR VEHICLE TANK

CROSS REFERENCE TO RELATED APPLICATIONS

This application is a National Stage entry under 35 U.S.C. § 371 of PCT/EP2022/074578, filed on Sep. 5, 2022, and claims priority to Luxembourg Patent Application No. LU500623, filed on Sep. 6, 2021. The entire contents of both are incorporated herein by reference.

1. FIELD OF THE INVENTION

The invention relates to the technical field of plastic tanks for motor vehicles, more particularly liquid fuel tanks. The invention generally relates to a frame for a plastic tank for a motor vehicle comprising at least one means for attaching an internal reinforcing element of the tank.

More particularly, the invention relates to a frame for a plastic tank for a motor vehicle comprising at least one means for attaching an internal reinforcing element for a plastic tank for a motor vehicle.

The invention also relates to an assembly designed to be attached inside a plastic tank for a motor vehicle comprising said frame and at least one internal reinforcing element, as well as to the plastic tank for a motor vehicle comprising said assembly. The invention also relates to a method for manufacturing a plastic tank for a motor vehicle.

2. SOLUTIONS OF THE PRIOR ART

Plastic fuel tanks obtained by extrusion blow-molding a parison undergo dimensional variations over their life, which can occur initially as soon as they exit the mold as a result of cooling thereof which is accompanied by shrinkage of the material, or during use thereof as a result in particular of positive or negative pressure of their contents, or as a result of thermal expansion thereof over their life, or as a result of aging thereof.

It is known practice to insert internal reinforcing elements within the tank during the manufacture thereof. The purpose of these internal reinforcing elements is to increase the ability of the plastic tank to withstand the mechanical stresses to which they are subjected over their life.

Thus, document US 2011/0226777 A1 discloses an assembly comprising a frame and connection elements for connecting to the walls of the tank, said connection elements exhibiting low stiffness which prevents them from providing an internal reinforcing function, said frame also comprising deformable structures in the longitudinal direction X of the vehicle, for which the frame is intended, and in the transverse direction Y of this vehicle, but also in the vertical direction Z of said vehicle. However, such an assembly has a fairly limited ability to adapt to the dimensional variations of the tank.

Furthermore, the resistance of such an assembly to compression and stretching in the vertical direction of the vehicle is too low.

3. OBJECTIVES OF THE INVENTION

The invention aims in particular to overcome these disadvantages of the prior art.

To this end, the invention aims to provide an assembly comprising a frame for a plastic tank for a motor vehicle, the assembly also comprising at least one internal reinforcing element, said assembly having an increased ability to adapt to variations in the dimensions of the tank, more particularly during the manufacture of said tank, and exhibiting improved resistance to compression and stretching.

More specifically, one objective of the invention, in at least one of its embodiments, is to provide a frame comprising an attachment means designed to attach at least one internal reinforcing element, the frame and the at least one internal reinforcing element being able to form an assembly that has an increased ability to adapt to variations in the dimensions of a plastic tank for a motor vehicle, more particularly during the manufacture of said tank.

The invention, in at least one of its embodiments, further aims to provide a plastic tank for a motor vehicle.

Another aim of the invention, in at least one of its embodiments, is to implement a method for manufacturing a plastic tank for a motor vehicle.

4. SUMMARY OF THE INVENTION

In accordance with a particular embodiment, the invention relates to a frame for a plastic tank for a motor vehicle comprising at least one means for attaching an internal reinforcing element of the tank.

According to the invention, the means for attaching the internal reinforcing element comprises at least one first structure configured to snap-fit at least a portion of the internal reinforcing element, said at least one first structure comprising at least two bodies movable relative to each other, each movable body being provided with a holding means configured to hold the internal reinforcing element in a direction opposite to the snap-fitting direction, and at least one stop element protruding in a direction opposite to the snap-fitting direction in order to provide a stop for the internal reinforcing element when said element is snap-fit into place.

The general principle of the invention is based on the presence of a means for attaching the internal reinforcing element that simultaneously makes it possible to snap-fit at least a portion of the internal reinforcing element and to hold the reinforcing element in position after snap-fitting in order to provide an attachment with an increased ability to withstand the mechanical stresses experienced by the assembly obtained during the manufacture of the tank and an increased ability to adapt to variations in the dimensions of the tank. The at least one first structure comprising at least two bodies movable relative to each other, each movable body being provided with a holding means configured to hold the internal reinforcing element in the direction opposite to the snap-fitting direction, makes it possible to snap-fit at least a portion of the internal reinforcing element, and the presence of at least one stop element protruding in the direction opposite to the snap-fitting direction provides a stop for the internal reinforcing element when said element is snap-fit into place. It is understood that this stop element is an element that is separate from the movable bodies, i.e. in particular that the holding means configured to hold the internal reinforcing element in the direction opposite to the snap-fitting direction is not coincident with the stop element.

Advantageously, the stop element allows the reinforcing element to be held in place after snap-fitting. The at least a portion of the internal reinforcing element is held in position and clamped after snap-fitting by the combination of the hold provided by the holding means that are configured to hold the internal reinforcing element in the direction opposite to the snap-fitting direction and are present on the movable bodies and the at least one stop element. Furthermore, after snap-fitting, the at least one portion of the internal reinforcing element is also held in position by the force exerted on it by the at least two movable bodies.

Thus, the invention is based on an entirely novel and inventive approach of an attachment means that makes it possible to increase the ability of an assembly comprising a frame and at least one internal reinforcing element to adapt to variations in the dimensions of the tank and makes it possible to decrease the stresses brought about by the presence of said assembly within the tank. Such an arrangement thus limits relative movements between the two parts in the two axes parallel to the weld surface in particular. Such an interconnection created between the internal reinforcing element and the frame makes it possible to ensure centering of the two parts and improved attachment.

The expression "internal reinforcing element" is understood to mean a structural element for connecting two opposite walls of the tank. The internal reinforcing element limits the deformation of the tank during the pressurization thereof. The internal reinforcing element is preferably welded to the plastic tank at both ends.

The term "tank" is understood to mean a sealed tank able to store a liquid fuel under diverse and varied environmental conditions and conditions of use. The tank according to the invention is made with a plastic wall, generally comprising an internal face in its concave part and an external face in its convex part. Preferentially, the tank is a liquid fuel plastic tank.

The expression "a first structure configured to snap-fit at least a portion of the internal reinforcing element" is understood to mean that at least a portion of the reinforcing element, preferably the entirety of the reinforcing element, is locked in place by the attachment means and prevented from moving after snap-fitting because of the clamping thereof between the holding means that are present on the movable bodies and the at least one stop element.

Advantageously, the at least one stop element has two surfaces, namely a first surface which is intended to form an axial stop surface for the internal reinforcing element in the snap-fitting direction, and a second surface which is intended to form a radial stop surface for the internal reinforcing element in a direction of rotation of the internal reinforcing element about an axis parallel to the axis of the axial stop.

Advantageously, the at least one stop element is configured to penetrate into a member for accommodating the internal reinforcing element so that after snap-fitting, the internal reinforcing element is rotatably locked in place. It is understood that this accommodating member can be formed in particular of a specific accommodating shape made in the internal reinforcing element.

Advantageously, the frame for a plastic tank for a motor vehicle according to the invention is such that the at least one first structure is configured to snap-fit at least an internal portion of the internal reinforcing element.

Thus, a first structure configured to snap-fit at least an internal portion of the internal reinforcing element allows improved attachment of the internal reinforcing element, with the movable bodies making it possible to limit movement of the internal reinforcing element in all directions. Specifically, the force exerted on the internal portion of the internal reinforcing element by the movable bodies can be in a greater number of directions.

The expression "an internal portion of the internal reinforcing element" is understood to mean a portion of the internal reinforcing element from which material has been removed such as, for example, a through-hole or a blind hole.

According to one preferred embodiment, the frame for a plastic tank for a motor vehicle according to the invention is such that the first structure is configured to snap-fit at least an external portion of the internal reinforcing element.

Thus, a first structure configured to snap-fit at least an external portion of the internal reinforcing element allows less robust attachment of the internal reinforcing element in the direction of welding of the internal reinforcing element while ensuring increased attachment of the internal reinforcing element in the other directions, the movable bodies engaging with the external portions of the internal reinforcing element that are not located at the weld locations.

The expression "the movable bodies engaging with the external portions of the internal reinforcing element that are not located at the weld locations" is understood to mean that the movable bodies are brought into contact with external portions of the internal reinforcing element that are not located at the weld locations and exert pressure thereon.

According to one preferred embodiment, the frame for a plastic tank for a motor vehicle according to the invention is such that the at least two bodies that are movable relative to each other are tabs.

Thus, bodies that are movable relative to each other taking the form of tabs make it possible to obtain a good compromise between rigidity and flexibility of the movable bodies.

According to one preferred embodiment, the frame for a plastic tank for a motor vehicle according to the invention is such that the holding means configured to hold the internal reinforcing element takes the form of a recess or a protrusion.

Thus, a holding means configured to hold the internal reinforcing element that takes the form of a recess or a protrusion makes it possible to have movable bodies that are easier to produce.

According to one preferred embodiment, the frame for a plastic tank for a motor vehicle according to the invention is such that the at least one stop element comprises a rod, preferentially a ribbed rod. The rod is advantageously X-, U-, V- or W-shaped.

Thus, a stop element comprising a rod allows a simpler adjustment of the positioning of the stop. What is meant by "rod" is a part that is elongated along a main axis, projecting along this axis from a surface of the first structure.

According to one preferred embodiment, the frame for a plastic tank for a motor vehicle according to the invention is based on a material selected from the group of materials consisting of high-density polyethylene (HDPE), polyoxymethylene (POM), polyamide (PA), polyphthalamide (PPA) and polyketone (PK). Preferentially, the frame takes the form of a one-piece part.

According to one preferred embodiment, the frame for a plastic tank for a motor vehicle according to the invention is such that the frame comprises support means for supporting components of the fuel tank such as a ventilation or liquid line, a valve such as a rollover valve (ROV) or a fill limit vent valve (FLVV), a temperature sensor, a level sensor or a quality sensor. The frame can also comprise or act as a support for a deflector, also called noise-reducing baffles or slosh baffles. Preferentially, the components of the fuel tank and/or the deflector are/is attached to the frame by clipping. Thus, clipping allows easy handling and attachment of the components of the fuel tank and/or the deflector to the frame.

According to one preferred embodiment, the frame for a plastic tank for a motor vehicle according to the invention is such that it comprises a deformable connection connecting the frame and the at least one means for attaching the internal reinforcing element, said connection being designed to deform in order to allow a relative movement of the frame and of the at least one means for attaching the internal reinforcing element with respect to one another when subjected to a mechanical load external to the frame.

Thus, a deformable connection makes it possible to reduce the stresses on the frame, said stresses being related to variations in temperature and pressure in the tank which give rise to deformations via movement of the one or more internal reinforcing elements with respect to one another. These movements give rise to stresses on the frame if no deformable connection is present on the frame and therefore between it and the one or more internal reinforcing elements. Preferentially, the deformable connection allows deformations in the axes parallel to the weld surface of the internal reinforcing element on the tank.

According to one preferred variant, the frame for a plastic tank for a motor vehicle is such that it comprises an accommodating member designed to receive an insertion means, such as an insertion rod for example, used during the manufacture of the tank in order to insert an assembly comprising the frame into a parison. Said accommodating member is advantageously provided in the form of a hole or a blind hole.

According to one preferred variant, the frame for a plastic tank for a motor vehicle is such that the frame comprises a plurality of through-holes. Preferentially, the frame is also provided with stiffening means such as ribs.

Thus, the presence of through-holes in the frame allows for easier movement of the liquid contained in the tank. The presence of stiffening means on the frame allows it to better withstand stresses related to the attachment of a component to the frame and stresses experienced thereby in a fuel tank.

Another aim of the invention is to provide an assembly for a plastic tank for a motor vehicle comprising a frame for a plastic tank for a motor vehicle according to the invention and an internal reinforcing element configured to be snap-fit onto the frame. Preferentially, the internal reinforcing element either takes the form of a pillar in the shape of a column, which is preferentially cylindrical, or in the shape of a diabolo, or takes the form of a holding member. Preferentially, the holding member comprises a wall provided with a central recess, a part of the wall comprising reinforcing ribs. The wall of the holding member can be planar or curved. Said reinforcing element preferentially comprises, at its two ends, two parts overmolded in a material suitable for being welded to the walls of the tank. The internal reinforcing element preferentially consists of a central part based on polyoxymethylene (POM), polyphthalamide (PPA), polyketone (PK), polyamide (PA), metal and two overmolded parts made of high-density polyethylene (HDPE). The internal reinforcing element preferentially comprises a region of mechanical weakness capable of causing said element to break when the element is subjected to high stresses resulting from the forces exerted on the tank. This region of mechanical weakness takes the form of a smaller cross section, of at least one notch or of a reduced thickness of the wall. The internal reinforcing element can comprise a hollow part, more particularly in the central part of the reinforcing element.

Another aim of the invention is to provide a plastic tank for a motor vehicle comprising an assembly for a plastic tank for a motor vehicle according to the invention.

Another aim of the invention is to provide a method for manufacturing a plastic tank for a motor vehicle.

According to one advantageous implementation, the method for manufacturing a plastic tank for a motor vehicle according to the invention, said method comprises a step of attaching, more specifically snap-fitting, an internal reinforcing element to a frame for a plastic tank for a motor vehicle according to the invention.

5. LIST OF FIGURES

Figure 2:
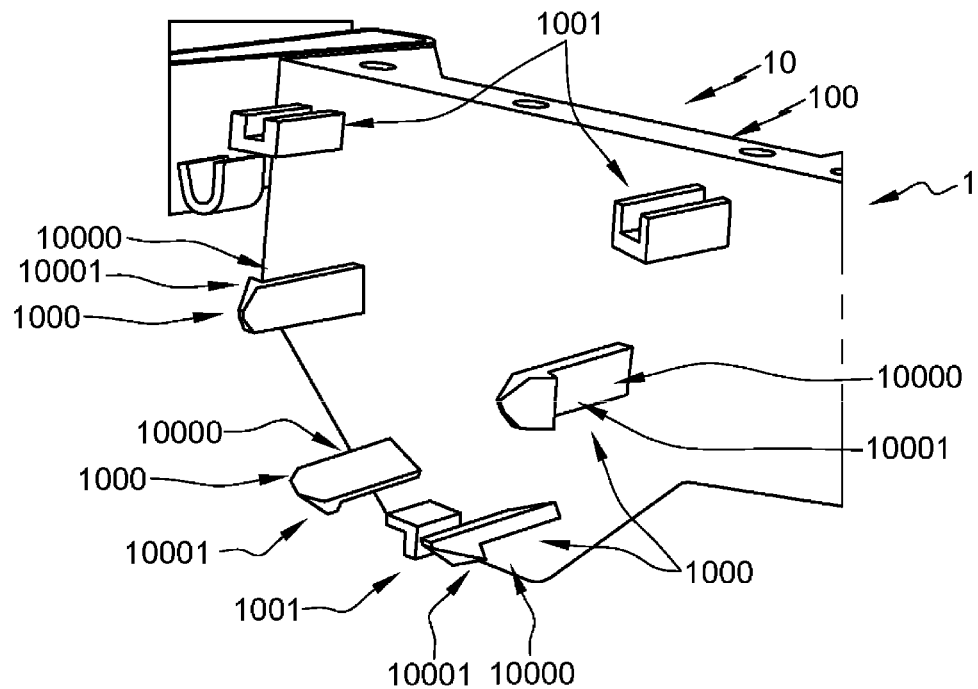
Figure 3:
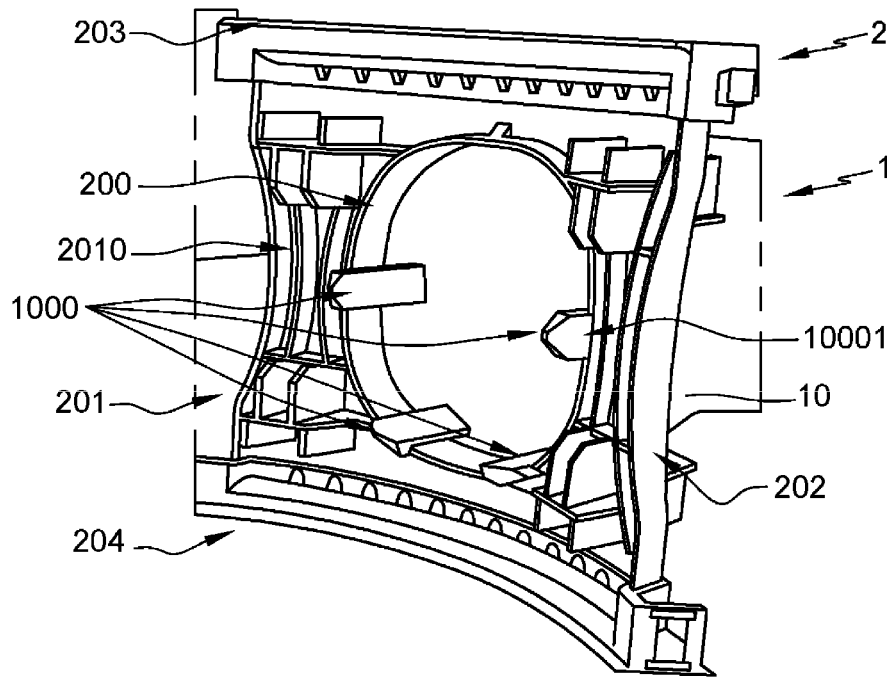

Other features and advantages of the invention will become more clearly apparent on reading the following description of a preferred embodiment, given by way of simple, illustrative and non-limiting example, and from the appended drawings, among which:

FIG. 1 shows an assembly for a plastic tank for a motor vehicle according to the invention, FIG. 2 illustrates a means for attaching an internal reinforcing element of a frame according to the invention, FIG. 3 illustrates the connection between an internal reinforcing element and a frame according to the invention.

6. DESCRIPTION OF AT LEAST ONE EMBODIMENT OF THE INVENTION

With reference to FIG. 1, one embodiment of an assembly 4 for a plastic tank for a motor vehicle according to the invention, comprising a frame 1 and internal reinforcing elements 2, is shown. The internal reinforcing element 2 is intended to connect two opposite walls of the tank. The frame 1 for a plastic tank for a motor vehicle comprises at least one means 10 for attaching an internal reinforcing element 2 to the tank. The frame 1 comprises a deformable connection 11 connecting the frame 1 and the means 10 for attaching the internal reinforcing element 2, said connection 10 being capable of deforming in order to allow a relative movement of the frame 1 and of the means 10 for attaching the internal reinforcing element 2 with respect to one another when subjected to a mechanical load external to the frame 1. The frame 1 also comprises an accommodating member 12 designed to accommodate an insertion means, such as an insertion rod for example, for inserting the assembly 4 into a parison during the manufacture of the tank. Said accommodating member 12 is advantageously provided in the form of a hole or a blind hole. The frame 1 is based on a material selected from the group of materials consisting of high-density polyethylene (HDPE), polyoxymethylene (POM), polyamide (PA), polyphthalamide (PPA) and polyketone (PK). The frame 1 also comprises support means 3 for components of the fuel tank such as a pump, a level sensor, a pressure sensor, a temperature sensor and a valve such as a rollover valve (ROV) or a fill limit vent valve (FLVV), or ventilation and fuel lines. The frame 1 also comprises a plurality of through-holes 13. Preferentially, the frame 1 is also provided with stiffening means such as ribs not shown. Preferentially, the internal reinforcing elements 2 take the form of a pillar 21 in the shape of a column, which is preferentially cylindrical, or in the shape of a diabolo. The internal reinforcing elements 2 can also be in the form of a holding member 20 comprising a wall provided with a central recess, a part of the wall comprising reinforcing ribs. The wall of the holding member can be planar or curved. Said reinforcing elements 2 preferentially comprise, at their two ends, two parts overmolded in a material suitable for being welded to the walls of the tank. The internal reinforcing elements 2 preferentially consist of a central portion based on polyoxymethylene (POM), polyphthalamide (PPA), polyketone (PK), polyamide (PA), metal and two overmolded parts made of high-density polyethylene (HDPE). The internal reinforcing elements preferentially comprise a region of mechanical weakness capable of causing said elements to break when the elements are subjected to high stresses resulting from the forces exerted on the tank.

FIG. 2 shows a means 10 for attaching an internal reinforcing element of the tank to a frame 1. Said means 10 comprises at least one first structure 100 configured to snap-fit at least a portion of the internal reinforcing element, said at least one first structure comprising at least two bodies 1000 movable relative to each other in the form of tabs 10000, each movable body 1000 being provided with a holding means 10001 configured to hold the internal reinforcing element 2 in the direction opposite to the snap-fitting direction, said holding means 10001 taking the form of a protrusion, and at least one stop element 1001 comprising a U-shaped rod. The stop element 1001 protrudes in the direction opposite to the snap-fitting direction in order to provide a stop for the internal reinforcing element 2 when said element is snap-fit into place. The first structure 100 is configured to snap-fit at least an internal portion of the internal reinforcing element 2. The stop element 1001 combined with the holding means 10001 form a clamp so that after snap-fitting, the at least a portion of the internal reinforcing element 2 is held in position and clamped by the combination of the hold provided by the holding means 10001 and the at least one stop element 1001. The stop element 1001 has at least two stop surfaces, namely a first surface which is intended to form an axial stop surface for the internal reinforcing element 2 in the snap-fitting direction, and a second surface which is intended to form a radial stop surface for the internal reinforcing element 2 in a direction of rotation of the internal reinforcing element 2 about an axis parallel to the axis of the axial stop. More specifically, in the example of FIG. 2, the axial stop surface corresponds to the U-shaped front face of the element 1001, extending substantially parallel to the rear face of the first structure 100, and the radial stop surface corresponds to one or more of the surfaces of the element 1001 extending substantially perpendicular to the rear face of the first structure 100.

FIG. 3 shows the connection between an internal reinforcing element 2 and a frame 1 according to the invention forming a portion of an assembly for a plastic tank for a motor vehicle according to the invention. The connection is made using a means 10 comprising at least one first structure 100 configured to snap-fit at least a portion of the internal reinforcing element 2, said at least one first structure 100 comprising four bodies that are movable relative to each other 1000 in the form of tabs, each movable body 1000 being provided with a holding means 10001 configured to hold the internal reinforcing element 2 in the direction opposite to the snap-fitting direction, said holding means 10001 taking the form of a protrusion, and at least one stop element. The first structure 100 is configured to snap-fit at least an internal portion 200 of the internal reinforcing element 2. The internal reinforcing elements 2 take the form of a holding member 20 comprising a wall 201 provided with a central recess 200, a portion of the wall 201 comprising reinforcing ribs 2010. The wall of the holding member is curved. Said reinforcing element preferentially comprises, at its two ends, two parts overmolded in a material suitable for being welded to the walls of the tank. The internal reinforcing element preferentially consists of a central part 202 based on polyoxymethylene (POM), polyphthalamide (PPA), polyketone (PK), polyamide (PA), metal and two overmolded parts made of high-density polyethylene (HDPE) 203, 204. The internal reinforcing element preferentially comprises a region of mechanical weakness capable of causing said element to break when the element is subjected to high stresses resulting from the forces exerted on the tank.

The invention claimed is:

1. A frame for a plastic tank for a motor vehicle, comprising:
    means for attaching an internal reinforcing element of the plastic tank which is intended to connect two opposite walls of said plastic tank,
    wherein the means for attaching the internal reinforcing element comprises a first structure configured to snap-fit at least a portion of the internal reinforcing element moved toward engagement with the first structure in a snap-fitting direction, said first structure comprising:
    two bodies that are movable relative to each other, each of said two bodies being provided with a holding means configured to hold the internal reinforcing element so as to stop the internal reinforcing element from moving in a direction opposite to the snap-fitting direction, and
    a stop element, separate from the two bodies, protruding in the direction opposite to the snap-fitting direction in order to provide a stop for the internal reinforcing element when said internal reinforcing element is snap-fit into place to prevent further movement of the internal reinforcing element in the snap-fitting direction,
    wherein the two bodies and the stop element protrude from a rear face of the first structure in the direction opposite to the snap-fitting direction, in which first ends of the two bodies and the stop element abut the rear face of the first structure, and second ends of the two bodies and the stop element are free, the second end of the stop element being closer to the rear face of the first structure than the second ends of the two bodies, and
    wherein the stop element comprises a rod.

2. The frame for a plastic tank for a motor vehicle of claim 1, wherein the stop element combined with the holding means form a clamp so that after snap-fitting, the portion of the internal reinforcing element is held in position and clamped by a combination of a hold provided by the holding means and the stop element.

3. The frame for a plastic tank for a motor vehicle of claim 1, wherein said first structure is configured to snap-fit an internal portion of the internal reinforcing element.

4. The frame for a plastic tank for a motor vehicle of claim 1, wherein said first structure is configured to snap-fit an external portion of the internal reinforcing element.

5. The frame for a plastic tank for a motor vehicle of claim 1, wherein the two bodies are tabs.

6. The frame for a plastic tank for a motor vehicle of claim 1, wherein the holding means configured to hold the internal reinforcing element is a recess or a protrusion.

7. The frame for a plastic tank for a motor vehicle of claim 1, wherein the frame further comprises support means for supporting components of the plastic tank selected from a ventilation line, a liquid line, a temperature sensor, a level sensor, a pressure sensor and a quality sensor.

8. The frame for a plastic tank for a motor vehicle of claim 1, wherein the frame further comprises a component selected from a noise-reducing baffle, a slosh baffle, a valve, a ventilation line, a liquid line, a temperature sensor, a level sensor, a pressure sensor and a quality sensor.

9. The frame for a plastic tank for a motor vehicle of claim 1, further comprising a deformable connection connecting the frame and the means for attaching the internal reinforcing element, said deformable connection being designed to deform in order to allow a relative movement of the frame and of the means for attaching the internal reinforcing element with respect to one another when subjected to a mechanical load external to the frame.

10. The frame for a plastic tank for a motor vehicle of claim 1, wherein the frame further comprises an accommodating member configured to accommodate an insertion means.

11. The frame for a plastic tank for a motor vehicle of claim 1, further comprising a plurality of through-holes.

12. An assembly for a plastic tank for a motor vehicle comprising the frame of claim 1 and an internal reinforcing element configured to be snap-fit onto the frame.

13. The assembly for a plastic tank for a motor vehicle of claim 12, wherein the internal reinforcing element is selected from a pillar and a holding member.

14. The assembly for a plastic tank for a motor vehicle of claim 13, wherein the holding member comprises a wall provided with a central recess, a portion of the wall comprising reinforcing ribs.

15. A plastic tank for a motor vehicle comprising the assembly for a plastic tank for a motor vehicle of claim 12.

16. A method for manufacturing a plastic tank for a motor vehicle comprising snap-fitting an internal reinforcing element to the frame for a plastic tank for a motor vehicle of claim 1.

17. The frame for a plastic tank for a motor vehicle of claim 1, wherein the rod is U-shaped, and the stop element includes an axial stop surface corresponding to a U-shaped front face of the stop element substantially parallel to the rear face of the first structure, and a radial stop surface corresponding to a surface of the stop element substantially perpendicular to the rear face of the first structure.

* * * * *